United States Patent [19]

Kress et al.

[11] Patent Number: 4,692,488

[45] Date of Patent: Sep. 8, 1987

[54] THERMOPLASTIC POLYCARBONATE MOULDING COMPOSITIONS

[75] Inventors: Hans-Jürgen Kress, Krefeld; Friedemann Müller, Neuss; Christian Lindner, Cologne; Horst Peters, Leverkusen; Josef Buekers, Krefeld, all of Fed. Rep. of Germany

[73] Assignee: Bayer Aktiengesellschaft, Leverkusen, Fed. Rep. of Germany

[21] Appl. No.: 875,495

[22] Filed: Jun. 18, 1986

[30] Foreign Application Priority Data

Jun. 29, 1985 [DE] Fed. Rep. of Germany ....... 3523314

[51] Int. Cl.⁴ .......................... C08K 5/53; C08K 5/52
[52] U.S. Cl. .................................... 524/139; 524/140; 524/141; 524/143; 524/504; 524/537
[58] Field of Search ............... 524/139, 141, 143, 140, 524/504, 537

[56] References Cited

U.S. PATENT DOCUMENTS

| Re. 31,165 | 3/1983 | Serini et al. ............................ 525/67 |
| 3,005,795 | 10/1961 | Busse et al. . |
| 3,294,871 | 12/1966 | Schmitt et al. . |
| 3,404,122 | 10/1968 | Fritz et al. . |
| 3,852,394 | 12/1974 | Kubota et al. ....................... 524/504 |
| 3,989,770 | 11/1976 | Prinz et al. .......................... 524/504 |
| 4,463,130 | 7/1984 | Serini et al. ............................ 525/67 |
| 4,481,338 | 11/1984 | Serini et al. .......................... 524/537 |
| 4,560,725 | 12/1985 | Van Bokhoven ..................... 525/67 |
| 4,564,654 | 1/1986 | Serini et al. ............................ 525/67 |

FOREIGN PATENT DOCUMENTS 80767 6/1983 European Pat. Off. .
103230 3/1984 European Pat. Off. .

OTHER PUBLICATIONS

Chemical Abstracts, vol. 90, Nr. 18, Apr. 1979, p. 36, Nr. 138688v, Columbus, Ohio "Heat Stabilizers for Polycarbonate" Author: Ohara, Osamu.

Primary Examiner—Lewis T. Jacobs
Attorney, Agent, or Firm—Connolly and Hutz

[57] ABSTRACT

The present invention relates to high-impact, flame-repellant thermoplastic polycarbonate moulding compositions consisting of halogen-free polycarbonates, halogen-free copolymers of styrenes and (meth)acrylonitrile, halogen-free phosphorus compounds of the formula (I)

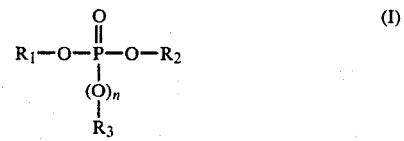

tetrafluoroethylene polymers and small amounts of graft polymers and, if appropriate, effective amounts of stabilizers, pigments, flow control agents, mould release agents and/or antistatics, and a process for their preparation.

18 Claims, No Drawings

THERMOPLASTIC POLYCARBONATE MOULDING COMPOSITIONS

The present invention relates to high-impact, flame-repellant thermoplastic polycarbonate moulding compositions consisting of A.
60 to 90% by weight of a thermoplastic, halogen-free aromatic polycarbonate, B.
10 to 40% by weight of a halogen-free thermoplastic copolymer of 50 to 95% by weight of styrene, α-methylstyrene, nuclear-substituted styrene or mixtures thereof and 5 to 50% by weight of (meth)acrylonitrile, C.
1 to 20 parts by weight, preferably 5 to 15 parts by weight, per 100 parts by weight of the total weight of A. and B., of a halogen-free phosphorus compound of the formula (I)

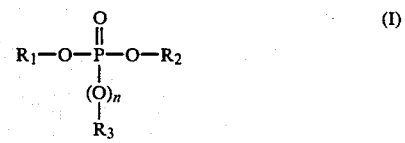

wherein
$R_1$, $R_2$ and $R_3$ independently of one another are $C_1$–$C_8$-alkyl or optionally alkyl-substituted $C_6$–$C_{20}$-aryl and
"n" represents 0 or 1,
and D.
0.05 to 2.0 parts by weight, in particular 0.1 to 1.0 part by weight, per 100 parts by weight of the total weight of A. and B., of a tetrafluoroethylene polymer with average particle sizes of 0.05 to 20 μm and a density of 1.2 to 1.9 g/cm³, component D. being employed in the form of a coagulated mixture of emulsions of the tetrafluoroethylene polymers D. with emulsions of not more than 3 parts by weight, but at least 0.1 parts by weight, per 100 parts by weight of the sum of components A. and B., of graft polymers E.
of 5 to 90 parts by weight, preferably 30 to 80 parts by weight, of a mixture of E.1.1
50 to 95% by weight of styrene, α-methylstyrene, nuclear-substituted styrene, methyl methacrylate or mixtures thereof and E.1.2
50 to 5% by weight of (meth)acrylonitrile, methyl methacrylate, maleic anhydride, N-substituted maleimide or mixtures thereof, on E.2.
95 to 10 parts by weight, preferably 70 to 20 parts by weight, of a rubber with a glass transition temperature $T_{TG} \leq 10°$ C., and the weight ratio of graft polymer E. to tetrafluoroethylene polymer D. being between 95:5 and 60:40, and, if appropriate, effective amounts of stabilizers, pigments, flow control agents, mould release agents and/or anti-statics.

According to DE-OS (German Published Specification) No. 2,228,072, thermoplastic polycarbonates are rendered flame-repellant with a mixture of hexabromobenzene and an antimony compound, and can additionally contain a phosphate ester as a synergist. Simply adding 10 parts by weight of triphenyl phosphate to bisphenol A polycarbonate has, however, no anti-drip effect according to flammability test U.L. Subj. 94 (see page 20 of DE-OS (German Published Specification) No. 2,228,072).

British Patent Specification No. 1,459,648 describes flame-repellant, non-dripping polymers, for example of ABS polymers or of polycarbonates, to which a flame-proofing additive, such as, for example, triphenylphosphate, a non-combustible fibre material and polytetrafluoroethylene resin have been admixed. Example 2 of British Patent Specification No. 1,459,648 shows that polytetrafluoroethylene resin does not prevent dripping without the addition of fibre.

Foamable thermoplastics are known from DE-OS (German Published Specification) No. 2,434,085, thermoplastics mentioned being, inter alia, polycarbonates, polymers or mixtures thereof. Polymers mentioned are also those of butadiene, styrene and acrylonitrile or of styrene alone. The foamable plastics can contain phosphate esters, if appropriate in combination with halogen compounds, as flameproofing agents. No polytetrafluoroethylene polymers are recommended as halogen compounds.

The addition of pentaerythritol diphosphates and diphosphonates as flameproofing agents for polycarbonates is described according to DE-OS (German Published Specification) No. 2,921,325, and halogen compounds, which, according to U.S. Pat. No. 3,392,136 quoted on page 9 of DE-OS (German Published Specification) No. 2,921,325, can also be polyvinylidene fluorides, can additionally be caused. ABS copolymers can be admixed to the polycarbonates.

Flame-repellant ABS polymers, inter alia, which contain polytetrafluoroethylenes are known from U.S. Pat. Nos. 4,355,126 and 4,107,232. Triphenylphosphate is the particularly preferred flameproofing agent.

Flame-repellant mixtures of polycarbonates, ABS polymers and halogen compounds are known from DE-OS (German Published Specification) Nos. 2,903,100 and 2,918,883. According to DE-OS (German Published Specification) No. 2,903,100, the flame-repellancy is achieved by particular organic sulphonates. Fluorinated polyolefins can be added as drip-inhibiting agents. According to DE-OS (German Published Specification) No. 2,918,883, the flame-repellancy is achieved by alkali metal or alkaline earth metal salts of acids in combination with anti-drip agents, the ABS polymers making up only a maximum of 10% by weight, based on the total mixture.

Flame-repellant polymer mixtures which, in addition to polytetrafluoroethylenes and organic halogen compounds, contain polyphosphates with molecular weights $\overline{M}w$ of 1600 to 150,000 in amounts of 1 to 35% by weight, are also known (European Pat. No. A-0,103,230). However, the polycarbonates of these moulding compositions are predominantly built up from tetramethylated diphenols.

Flame-repellant thermoplastic moulding compositions which contain
(a) aromatic polycarbonates,
(b) SAN graft polymers,
(c) thermoplastic polymers,
(d) if appropriate halogen compounds, (e) antimony trioxide, antimony carbonate, bismuth trioxide or bismuth carbonate and (f) fine-particled tetrafluoroethylene polymer, this being introduced into the moulding composition via an aqueous emulsion of the SAN graft polymer (b) and, if appropriate, an aqueous emulsion of the thermoplastic polymer (c), whereupon good surfaces of the moulding compositions are achieved, are known from DE-OS (German Published Specification) No. 3,322,260. According to page 16 of this DE-OS it is possible to transfer this kind of incorporation of tetrafluoroethylene polymers onto all polycarbonate-containing moulding materials.

Reference may also be made to French Patent Specification No. 1,412,767 in respect of the difficult procsssing of polytetrafluoroethylenes, and reference may also be made to U.S. Pat. No. 3,294,871 in respect of the incorporation of polytetrafluoroethylenes into thermoplastics, such as aromatic polycarbonates or polymers of unsaturated monomers, and to U.S. Pat. No. 3,005,795, in particular columns 3/4, where precipitation and coagulation are mentioned.

The moulding compositions according to the invention are distinguished by a good impact strength, a good nature of the surface and a high flame-repellancy, without containing the halogen compounds and metal compounds usually employed in fire treasure technology.

Thermoplastic, halogen-free aromatic polycarbonates of component A. which are suitable according to the invention are those based on diphenols of the formula II

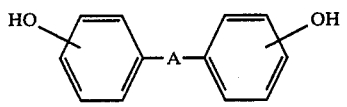
(II)

wherein
A is a single bond, $C_1$–$C_5$-alkylene, $C_2$–$C_5$-alkylidene, $C_5$–$C_6$-cycloalkylidene, —S— or —$SO_2$—.

Examples of suitable diphenols of the formula II are hydroquinone, resorcinol, 4,4'-dihydroxydiphenyl, 2,2-bis-(4-hydroxyphenyl)-propane, 2,4-bis-(4-hydroxyphenyl)-2-methylbutane or 1,1-bis-(4-hydroxyphenyl)-cyclohexane.

Preferred diphenols of the formula II are 2,2-bis-(4-hydroxyphenyl)-propane and 1,1-bis-(4-hydroxyphenyl)-cyclohexane.

The diphenols of the formula II either are known from the literature or can be prepared by the process known from the literature.

The preparation of the polycarbonates of component A. which are suitable according to the invention is known from the literature and can be carried out, for example, with phosgene by the phase boundary process or with phosgene by the processes in a homogeneous phase system (the so-called pyridine process), the molecular weight to be established in each case being achieved in a known manner by a corresponding amount of known chain stoppers. Examples of suitable chain stoppers are monophenols, such as phenol itself, p-cresol, p-tert.-butylphenol and p-isooctylphenol.

The polycarbonates of component A. which are suitable according to the invention have weight-average molecular weights ($\overline{M}w$, measured, for example, by ultracentrifugation or by scattered light measurement) of 10,000 to 100,000, preferably 20,000 to 80,000.

The polycarbonates of component A. which are suitable according to the invention are either homopolycarbonates or copolycarbonates.

The polycarbonates of component A. which are suitable according to the invention can be branched in a known manner, and in particular preferably by incorporating 0.05 to 2.0 mol %, based on the sum of the diphenols employed, of compounds which are trifunctional or more than trifunctional, for example those with three or more than three phenolic OH groups.

Halogen-free polycarbonates in the context of the present invention means that the polycarbonates are built up from halogen-free diphenols, halogen-free chain stoppers and, if appropriate, halogen-free branching agents, the content of minor ppm amounts of hydrolysable chlorine resulting, for example, from the preparation of the polycarbonates with phosgene by the phase boundary process, not being regarded as halogen-containing in the context of the invention. Such polycarbonates with ppm contents of hydrolysable chlorine are halogen-free polycarbonates in the context of the present invention.

Halogen-free, thermoplastic copolymers of component B. which are suitable according to the invention are resinous, thermoplastic and rubber-free. Particularly preferred polymers B. are those of styrene and/or α-methylstyrene with acrylonitrile. Nuclear-substituted styrenes are to be understood as nuclear-alkylated styrenes, such as, for example, p-methylstyrene.

Particularly preferred weight ratios in the thermoplastic polymer B. are 60 to 80% by weight of styrene, α-methylstyrene, nuclear-substituted styrene or mixtures thereof and 40 to 20% by weight of acrylonitrile.

The polymers of component B. are known and can be prepared by free radical polymerization, in particular by emulsion, suspension, solution or bulk polymerization. The polymers of component B. preferably have molecular weights $\overline{M}w$ (weight average, determined by light scattering or sedimentation) of between 15,000 and 200,000.

The halogen-free phosphorus compounds of component C. which are suitable according to the invention are generally known (see, for example, Ullmann, Enzyklopädie der technischen Chemie (Encyclopaedia of Industrial Chemistry), volume 18, page 301 et seq., 1979; Houben-Weyl, Methoden der Organischen Chemie (Methods of Organic Chemistry), volume 12/1, page 43; and Beilstein, volume 6, page 177).

Phosphorus compounds of component C., formula (I), which are suitable according to the invention, are, for example, triphenyl phosphate, tricresyl phosphate, diphenyl 2-ethylcresyl phosphate, tri-(iso-propylphenyl) phosphate, diphenyl methyl phosphonate and diethyl phenyl phosphonate.

The tetrafluoroethylene polymers of component D. which are suitable according to the invention are polymers with fluorine contents of 65 to 76% by weight, preferably 70 to 76% by weight. Examples are polytetrafluoroethylene, tetrafluoroethylene/hexafluoropropylene copolymers and tetrafluoroethylene copolymers with small amounts of fluorine-free, copolymerizable, ethylenically unsaturated monomers.

Such polymers are known. They can be prepared by known proces$es, thus, for example, by polymerization of tetrafluoroethylene in an aqueous medium with a catalyst which forms free radicals, for example the peroxydisulphate of sodium, potassium or ammonium, under pressures of 7 to 71 kg/cm$^2$ and at temperatures of 0° to 200° C., preferably at temperatures of 20° to 100° C. (U.S. Pat. No. 2,393,967).

The particle size of the tetrafluoroethylene polymers according to the invention is in the range from 0.05 to 20 μm, and the density is in the range from 1.2 to 1.9 g/cm$^3$.

By adding tetrafluoroethylene polymers, the dripping of the moulding composition melts during the burning operation, in particular, is reduced or prevented completely.

Thus, if the moulding compositions according to the invention are prepared, for example, from granules or powders of components A. to C. and a polytetrafluoroethylene powder which has a particle size and density greater than the range according to the invention by melt compounding in kneaders or extruders, moulding compositions of high flame-repellancy are indeed obtained, but shaped articles therefrom sometimes have a defective surface, for example micro-cracks or streaks.

This is avoided with certainty if the very fine-particled and furthermore non-sintered tetrafluoroethylene polymers are employed in the form of a coagulated mixture of emulsions of the tetrafluoroethylene polymers D. with emulsions of graft polymers E.

To prepare a corresponding mixture, an aqueous emulsion (latex) of a graft polymer E. with average latex particle sizes of 0.1 to 2 μm, in particular 0.2 to 0.6 μm, is first mixed with a fine-particled emulsion of a tetrafluoroethylene polymer in water, with average particle sizes of 0.05 to 20 μm, in particular 0.08 to 10 μm; suitable tetrafluoroethylene polymer emulsions usually have solids contents of 30 to 70% by weight, in particular 50 to 60% by weight. The emulsions of the graft polymers E. have solids contents of 25 to 60% by weight, in particular 30 to 45% by weight.

The weight ratio of graft polymer E, to tetrafluoroethylene polymer D. in the emulsion mixture is between 95:5 and 60:40. The emulsion mixture is then coagulated in a known manner, for example by spray-drying, freezedrying or coagulation by means of the addition of inorganic or organic salts, acids, bases or organic, water-miscible solvents, such as alcohols or ketones, preferably at temperatures of 20° to 150° C., in particular 50° to 100° C. If necessary, drying can be carried out at 50° to 200° C., preferably 70° to 100° C.

Suitable tetrafluoroethylene polymer emulsions are commercially available products and are available, for example, from DuPont as Teflon ® 30 N.

Rubbers which are suitable for the preparation of the graft polymers of component E. are, in particular, polybutadiene and butadiene/styrene copolymers with up to 30% by weight, based on the weight of rubber, of a lower alkyl ester of acrylic or methacrylic acid (for example methyl methacrylate, ethyl acrylate, methyl acrylate or ethyl methacrylate). Another suitable rubber is, for example, polyisoprene. Alkyl acrylate rubbers based on $C_1$-$C_8$-alkyl acrylates, in particular ethyl, butyl and ethylhexyl acrylate, are moreover suitable.

If appropriate, these alkyl acrylate rubbers can contain up to 30% by weight, based on the weight of rubber, of copolymerised monomers, such as vinyl acetate, acrylonitrile, styrene, methyl methacrylate and/or vinyl ether. These alkyl acrylate rubbers can furthermore contain relatively small amounts, preferably up to 5% by weight, based on the weight of rubber, of crosslinking and ethylenically unsaturated monomers. Such crosslinking agents are, for example, alkylenediol di(meth)-acrylates, polyester di(meth)-acrylates, divinylbenzene, trivinylbenzene, triallylcyanurate, allyl(meth)-acrylate, butadiene or isoprene. Such alkyl acrylates are known. Acrylate rubbers as the graft base can also be products which contain, as the core, a crosslinked diene rubber of one or more conjugated dienes with an ethylenically unsaturated monomer, such as styrene and/or acrylonitrile. Other suitable rubbers are, for example, EPDM rubbers, that is to say rubbers of ethylene, propylene and a non-conjugated diene monomer.

Preferred rubbers for the preparation of the graft polymers E. are diene and alkyl acrylate rubbers.

The rubbers are present in the graft polymers E. in the form of at least partly crosslinked particles with an average particle size of 0.1 to 2.0 μm, in particular 0.2 to 0.6 μm.

The graft polymers E. are prepared by free radical grafting copolymerization of the monomer mixtures of E.1.1 and E.1.2 defined above, in the presence of the rubbers E.2 to be grafted, and are widely known. Preferred preparation processes for the graft polymers E. are emulsion, solution, bulk or suspension polymerization. Particularly preferred graft polymers E. are the so-called ABS polymers. p-Methylstyrene may be mentioned as a nuclear-substituted styrene.

Since the use of the graft polymers E. to be employed according to the invention is effected by prior mixing of their emulsions with emulsions of component D., preparation of component E. by the emulsion polymerization process is most advantageous.

The thermoplastic moulding compositions according to the invention can contain other additives known for polycarbonates or for thermoplastic polymers, such as stabilizers, pigments, flow control agents, mould release agents and/or antistatics.

The moulding compositions according to the invention, consisting of components A., B., C., D. and E. and, if appropriate, other known additives, such as stabilizers, pigments, flow control agents, mould release agents and/or antistatics, are prepared by a process in which the particular constituents are mixed in a known manner and are then subjected to melt compounding or melt extrusion at temperatures of 200° to 330° C. in the customary units, such as internal kneaders or one- or two-screw extruders, or by a process in which solutions of the particular components in suitable organic solvents, for example in chlorobenzene, are mixed and the solution mixtures are evaporated in the customary evaporation units, for example in evaporation extruders.

The individual constituents can be mixed be mixed either successively or simultaneously in a known manner, and in particular either at about 20° C. (room temperature) or at a higher temperature.

The moulding compositions of the present invention can be used for the preparation of shaped articles of all types. In particular, shaped articles can be produced by injection moulding. Examples of shaped articles which can be produced are: all types of housing components (for example for domestic appliances, such as coffee machines or mixers) or covering sheets for the construction sector and components for the motor vehicle sector. They are also employed in the field of electrical engineering, because they have very good electrical properties.

Another form of processing is the production of shaped articles by deep-drawing or thermoforming of sheets or films produced beforehand by extrusion.

Particle size always denotes average particle diameter $d_{50}$, determined by ultracentrifuge measurements in accordance with the method of W. Scholtan et al., Kolloid-Z, u. Z. Polymere 250 (1972) 782–796.

EXAMPLES

Blend components used

A. Polycarbonate of 2,2-bis-(4-hydroxyphenyl)-propane (bisphenol A) with a relative solution viscosity of 1.280, measured in methylene chloride at 23° C. and a concentration of 0.5% by weight.

B. Styrene/acrylonitrile copolymer with a styrene/acrylonitrile ratio of 72:28 and a limit viscosity of $[\eta]=0.55$ dl/g (measurement in dimethylformamide at 20° C.).

C. Triphenyl phosphate

D1. Tetrafluoroethylene polymer as a coagulated mixture of an SAN graft polymer and a tetrafluoroethylene polymer emulsion in water; content of tetrafluoroethylene polymer in the mixture: 10% by weight, based on the mixture of PTFE/SAN graft polymer. The tetrafluoroethylene polymer emulsion has a solids content of 60%; the particle size is between 0.05 and 0.5 μm. The SAN graft polymer emulsion has a solids content of 34% by weight and has a latex particle size of 0.3 to 0.4 μm. Preparation of D.1: The emulsion of the tetrafluoroethylene polymer is mixed with the emulsion of the SAN graft polymer E and stabilized with 1.8% by weight based on the polymer solid, of phenolic antioxidant. The mixture is coagulated with an aqueous solution of $MgSO_4$ (Epsom salt) and acetic acid at pH 4 to 5 at 85° to 95° C., filtered, washed until virtually free from electrolytes, subsequently freed from most of the water by centrifugation and then dried at 100° C. to give a powder. This powder can then be compounded with the other components in the units described.

D2. Tetrafluoroethylene polymer in powder form with a particle size of 500 to 650 μm and a density of 2.18 to 2.20 g/cm$^2$ from Hoechst (Hostaflon TF 2026).

E. SAN graft polymer of 50% by weight of a styrene/acrylonitrile mixture (in a weight ratio of 72:28) on 50% by weight of polybutadiene in particle form with an average particle size ($d_{50}$) of 0.3–0.4 μm, obtained by emulsion polymerization.

Preparation of the moulding compositions according to the invention

Components A., B., C., D. and E. were compounded on a twin-screw extruder (Werner und Pfleiderer) Type ZSK 53 at a temperature of 230° C.

Shaped articles were produced on an injection-moulding machine at 260° C.

The burning behaviour of the samples were measured in accordance with UL-Subj. 94 V in testpiece thicknesses of 1.6 mm. The UL-94 test is carried out as follows:

Substance samples are shaped to bars with the dimensions 127×12.7×1.6 mm. The bars are mounted vertically so that the underside of the testpiece is 305 mm above a strip of bandage material. Each test bar is ignited individually by means of two successive ignition operations lasting 10 seconds, the burning characteristics are observed after each igniting operation and the sample is then evaluated. A Bunsen burner with a blue flame, 10 mm (3.8 inches) high, of natural gas with a thermal unit of $3.73 \times 10^4$ kJ/m$^3$ (1.000 BTU per cubic foot) is used for igniting the sample.

The UL-94 V-0 classification comprises the properties, described below, of materials which have been tested in accordance with the UL-94 specification. The polycarbonate moulding compositions in this class contain no samples which burn for longer than 10 seconds after each action of the test flame; they show no total flaming time of more than 50 seconds when the flame acts twice on each set of samples; they contain no samples which burn completely up to the holding clamp attached to the upper end of the sample; they contain no samples which ignite the cotton-wool arranged underneath the sample by burning drips or particles; they also contain no samples which glow for longer than 30 seconds after removal of the test flame.

Other UL-94 classifications describe samples which are less flame-repellant and self-extinguishing and which give flaming drips or particles. These classifications are designated UL-94 V-1 and V-2. N.p. means "not passed" and is the classification of samples which have an afterburn time of $\geq 30$ seconds.

The evaluation of the shaped article surface in respect of surface disorders, such as streaks, was carried out visually on testpieces with dimensions of 127×127×1.6 mm.

The notched impact strength and the impact strength were determined in accordance with DIN 53 453/ISO R 179 on bars with dimensions of 90×10×4 mm, the bars being provided with a V-shaped notch of notch depth 2.7 mm for the notched impact strength.

The precise compositions of the moulding materials tested and the test data obtained can be seen from the following table.

| | A parts by weight | B parts by weight | C parts by weight | D1 parts by weight | D2 parts by weight | UL-94 V 3.2 mm | UL-94 V 1.2 mm | Notched impact strength | Impact strength | Nature of the surface |
|---|---|---|---|---|---|---|---|---|---|---|
| | | | | | Comparison experiment | | | | | |
| 1 | 75 | 25 | | | | np | np | 5 | n.b.* | free from streaks |
| 2 | 68 | 23 | 8 | | 0.25 | V0 | V1 | 6 | n.b.* | cords |
| | | | | Experiment according to the invention | | | | | | |
| 3 | 65.2 | 21.8 | 10 | 3.0 | | V0 | V0 | 5 | n.b.* | free from streaks | n.b.* = not broken

We claim:

1. A thermoplastic moulding composition comprising
A. 60 to 90% by weight of a thermoplastic, halogen-free aromatic polycarbonate,
B. 10 to 40% by weight of a halogen-free thermoplastic copolymer of 50 to 95% by weight of styrene, α-methylstyrene, nuclear-substituted styrene or mixtures thereof and 5 to 50% by weight of (meth)acrylonitrile, C. 1 to 20 parts by weight, per 100 parts by weight of the total weight of A. and B., of a halogen-free phosphorus compound of the general formula

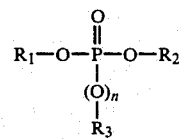

in which
R$_1$, R$_2$ and R$_3$ independently of one another denote a C$_1$-C$_8$-alkyl radical or an optionally alkyl-substituted C$_6$-C$_{20}$-aryl radical and n is 0 or 1, and
D. 0.05 to 2.0 parts by weight, per 100 parts by weight of the total weights of A. and B., of a tetrafluoroethylene polymer with average particle sizes of 0.05 to 20 μm and a density of 1.2 to 1.9 g/cm$^3$, component D. being employed in the form of a coagulated mixture of emulsions of the tetrafluoroethylene polymers D. with emulsions of not more than 3 parts by weight, but at least 0.1 parts by weight, per 100 parts by weight of the sum of components A. and B., of
E. graft polymer(s) of
1. 5 to 90 parts by weight of a mixture of
   (i) 50 to 95% by weight of styrene, α-methylstyrene, nuclear-substituted styrene, methyl methacrylate or mixtures thereof and
   (ii) 50 to 5% by weight of (meth)acrylonitrile, methyl methacrylate, maleic anhydride, N-substituted maleimide or mixtures thereof, on
2. 95 to 10 parts by weight of a rubber with a glass transition temperature T$_G$≦10° C., and the weight ratio of graft polymer E. to tetrafluoroethylene polymer D. being between 95:5 and 60:40.

2. A moulding composition according to claim 1, in which the polycarbonate of component A. is based on 2,2-bis-(4-hydroxyphenyl)-propane or 1,1-bis-(4-hydroxyphenyl)-cyclohexane.

3. A moulding composition according to claim 1 in which the polycarbonate of component A. has a weight-average molecular weight $\overline{M}_W$ of 20,000 to 80,000.

4. A moulding composition according to claim 1, in which the polymer of component B. comprises 60 to 80% by weight of styrene, α-methylstyrene, nuclear-substituted styrene or mixtures thereof and 40 to 20% by weight of acrylonitrile.

5. A moulding composition according to claim 1, in which the phosphorus compound of component C. is selected from triphenyl phosphate, tricresyl phosphate, diphenyl-2-ethylcresyl phosphate, tri(isopropylphenyl) phosphate, diphenyl methyl phosphonate and diethyl phenyl phosphonate.

6. A moulding composition according to claim 1, in which the tetrafluoroethylene compound of component D. is selected from polytetrafluoroethylene, tetrafluoroethylene/hexafluoropropylene copolymers and tetrafluoroethylene copolymers with a minor amount of fluorine-free, copolymerisable, ethylenically unsaturated monomer.

7. A moulding composition according to claim 1, in which the rubber of graft polymer E. is an alkyl acrylate rubber based on C$_1$ to C$_8$ alkyl acrylates.

8. A moulding composition according to claim 1, in which component C. is present in amounts of 5 to 15 parts by weight.

9. A moulding composition according to claim 1, in which component D. is present in amount of 0.1 to 1.0 part by weight.

10. A moulding composition according to claim 1, in which the graft polymer E. is prepared from 30 to 80 parts by weight of the mixture of components (i) and (ii) on 70 to 20 parts by weight of the rubber 2.

11. A moulding composition according to claim 1, in which additionally comprises at least one additive selected from stabilizers, pigments, flow control agents, mould release agents and antistatics.

12. A process for the production of a moulding composition according to claim 1, in which components A., B., C., D. and E. are mixed and the mixture is then subjected to melt compounding or melt extrusion at a temperature from 200° C. to 330° C. in a melt-compounding or melt-extrusion unit.

13. A process for the production of a moulding composition according to claim 1, in which solution of components A., B., C., D. and E. are mixed in an organic solvent and the solution mixture is then evaporated in an evaporation unit.

14. A process according to claim 12 wherein at least one additive selected from stabilizers, pigments, flow control agents, mould release agents and antistatics is included in the mixture.

15. A moulding composition whenever produced by the process of claim 12.

16. A moulded article whenever produced from a moulding composition according to claim 1.

17. A process according to claim 13 wherein at least one additive selected from stabilizers, pigments, flow control agents, mould release agents and antistatics is included in the solution.

18. A moulded composition whenever produced by the process of claim 13.

* * * * *